United States Patent
Chikaoka et al.

(10) Patent No.: US 7,848,193 B2
(45) Date of Patent: Dec. 7, 2010

(54) DISC DEVICE

(75) Inventors: Atsuhiko Chikaoka, Daito (JP);
Tetsuya Shihara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 570 days.

(21) Appl. No.: 11/977,816

(22) Filed: Oct. 26, 2007

(65) Prior Publication Data

US 2008/0101182 A1 May 1, 2008

(30) Foreign Application Priority Data

Oct. 26, 2006 (JP) .............................. 2006-291132

(51) Int. Cl.
*G11B 5/09* (2006.01)
(52) U.S. Cl. .................... 369/47.14; 714/746; 714/747
(58) Field of Classification Search .............. 369/47.14; 714/746, 747
See application file for complete search history.

(56) References Cited

U.S. PATENT DOCUMENTS

| | | | | |
|---|---|---|---|---|
| 6,065,006 | A * | 5/2000 | deCarmo et al. .................... 1/1 |
| 6,408,408 | B1 | 6/2002 | Ko | |
| 6,865,551 | B1 * | 3/2005 | Stefik et al. .................... 705/51 |
| 7,065,671 | B2 | 6/2006 | Nishimura | |
| 7,444,296 | B1 * | 10/2008 | Barber et al. ................. 705/17 |
| 2002/0167874 | A1 * | 11/2002 | Hayashi ................... 369/44.13 |
| 2003/0009708 | A1 | 1/2003 | Nishimura | |
| 2003/0093790 | A1 | 5/2003 | Logan et al. | |
| 2004/0037193 | A1 * | 2/2004 | Andersen et al. ......... 369/53.14 |
| 2007/0226575 | A1 * | 9/2007 | Zhang et al. ................. 714/746 |

(Continued)

FOREIGN PATENT DOCUMENTS

EP          1 239 480 A2       9/2002

(Continued)

OTHER PUBLICATIONS

Extended European Search Report for European Application No. 07020829.3-1247, mailed on Feb. 28, 2008 (7 pages).

(Continued)

*Primary Examiner*—Jeffrey A Gaffin
*Assistant Examiner*—Steve Nguyen
(74) *Attorney, Agent, or Firm*—Osha Liang LLP

(57) ABSTRACT

The present invention provides a disc device capable of normally reproducing recorded information on a disc type recording medium while complementing the recorded information in a damaged portion of the recording medium with complementary information, and capable of constantly holding useful complementary information. The complementary information for complementing the recorded information in the damaged portion of the optical disc is acquired from a server and saved in a storage area of a storing unit, and the recorded information on the optical disc is reproduced while complementing the recorded information in the damaged portion with the complementary information. When a capacity of a free space in the storage area is less than a capacity necessary for saving acquired new complementary information, usefulness of the complementary information is evaluated based on time elapsed from last referenced time, a reference count, and an acquisition required expense for the complementary information saved in the storage area, the complementary information is deleted from the storage area in order of lower usefulness to enlarge the free space, and the new complementary information is saved in the free space.

7 Claims, 13 Drawing Sheets

U.S. PATENT DOCUMENTS

2010/0067335 A1* 3/2010 Li et al. .................... 369/47.14

FOREIGN PATENT DOCUMENTS

| EP | 1 473 934 A2 | 11/2004 |
|----|--------------|---------|
| EP | 1 653 464 A1 | 5/2006 |
| JP | 8-167250 | 6/1996 |
| JP | 10-341389 | 12/1998 |
| JP | 2002-150699 | 5/2002 |

OTHER PUBLICATIONS

Patent Abstracts of Japan, Publication No. 08-167250, Publication Date: Jun. 25, 1996, 2 page.
Patent Abstracts of Japan, Publication No. 10-341389, Publication Date: Dec. 22, 1998, 2 pages.
English Patent Abstract of JP2002150699 from esp@cenet, published May 24, 2002, 2 pages.

* cited by examiner

FIG. 2

DAMAGED PORTION INFORMATION MANAGEMENT TABLE

| THE NUMBER OF DAMAGED PORTION INFORMATION HELD | |
|---|---|
| Disc_ID[1] | table_point[1] |
| . | . |
| . | . |
| . | . |
| Disc_ID[n] | table_point[n] |

} DAMAGED PORTION INFORMATION TABLE

FIG. 3

DAMAGED PORTION INFORMATION TABLE

| Disc_ID[1] | | | | | | |
|---|---|---|---|---|---|---|
| SERVER ADDRESS STORING COMPLEMENTARY INFORMATION | | | | | | |
| EFFECTIVE DATA TRANSFER RATE | | | | | | |
| MAP ELEMENT NUMBER | | | | | | |
| MAPPING TABLE | address[1] | data_point[1] | data_size[1] | REFERENCE COUNT [1] | LAST REFERENCED TIME [1] | lock |
| | . | . | . | . | . | . |
| | . | . | . | . | . | . |
| | . | . | . | . | . | . |
| | address[n] | data_point[n] | data_size[n] | REFERENCE COUNT [n] | LAST REFERENCED TIME [n] | unlock |

} DAMAGED PORTION INFORMATION

FIG. 5

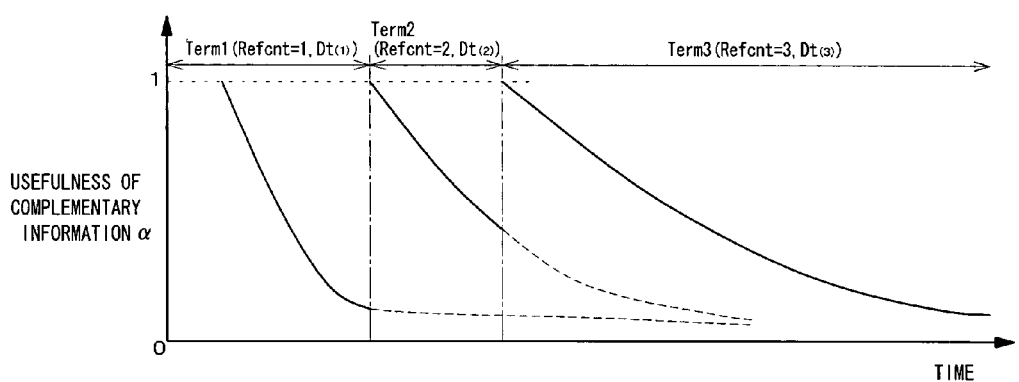

$$\text{USEFULNESS } \alpha \text{ OF COMPLEMENTARY INFORMATION} = \left(\frac{a + \text{Refcnt}}{n}\right)^{Dt} \times D_{size} \div T_{rate}$$

- a : CONSTANT
- n : CONSTANT ( $0 \leqq a \leqq n$ )
- Refcnt : COMPLEMENTARY INFORMATION REFERENCE COUNT,
  (Refcnt = REFERENCE COUNT WHEN Refcnt < n-a,
  AND Refcnt = n - a - 1 WHEN Refcnt ≧ n-a)
- Dt : TIME ELAPSED FROM COMPLEMENTARY INFORMATION LAST REFERENCED TIME
  (TIME FROM LAST REFERENCED TIME TO
  USEFULNESS COMPUTATION IMPLEMENTED TIME)
- $D_{size}$ : COMPLEMENTARY INFORMATION SIZE
- $T_{rate}$ : EFFECTIVE DATA TRANSFER RATE

FIG. 7

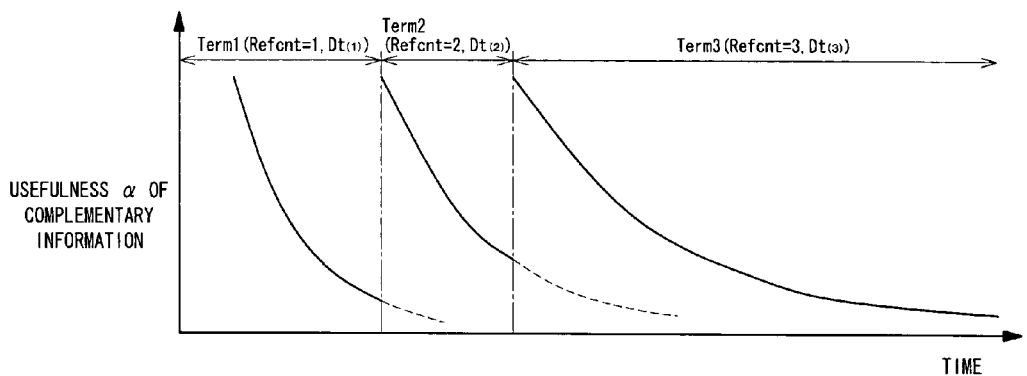

$$\text{USEFULNESS } \alpha \text{ OF COMPLEMENTARY INFORMATION} = -\log_a(Dt) \times T_{rate} \div D_{size} \div Refcnt$$

a > 1

Refcnt : COMPLEMENTARY INFORMATION REFERENCE COUNT
Dt : TIME ELAPSED FROM COMPLEMENTARY INFORMATION LAST REFERENCED TIME
$D_{size}$ : COMPLEMENTARY INFORMATION SIZE
$T_{rate}$ : EFFECTIVE DATA TRANSFER RATE

FIG. 8

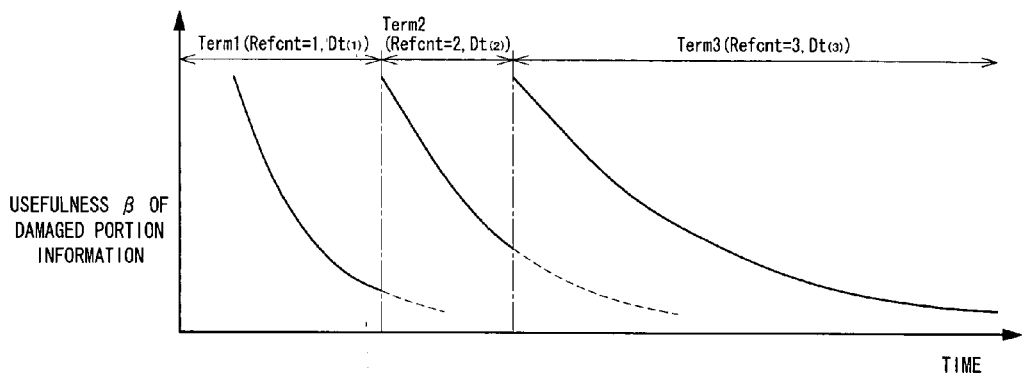

$$\text{USEFULNESS } \beta \text{ OF DAMAGED PORTION INFORMATION} = -\log_a(Dt) \div Refcnt$$

DISC DEVICE

BACKGROUND OF THE INVENTION

1. Field of the Invention

The present invention relates to a disc device for reading and reproducing information recorded on a disc type recording medium.

2. Description of the Related Art

There is known a disc device for optically or magnetically reading and reproducing video and sound information recorded on a disc type recording medium (hereinafter referred to as "disc"). When the disc is scratched or defected, the disc device cannot normally read and reproduce the information from a corresponding portion of the disc.

As countermeasures for a reading error, in Japanese Unexamined Patent Publication No. 8-167250 and Japanese Unexamined Patent Publication No. 2002-150699, when a defective sector exists in the disc such as a magnetic optical disc or hard disc, an alternate sector that acts as an alternate destination of the defective sector is arranged in the same disc or in a different memory etc. When recording the information on the disc, the information to be recorded in the defective sector is recorded in the alternate sector. When reproducing the information from the disc, the information recorded in the alternate sector is recorded on a memory etc. of high access speed, and then the information is read from the memory to complement the information corresponding to the defective sector.

While, in Japanese Unexamined Patent Publication No. 10-341389, information same as the information recorded on the disc such as a magnetic optical disc is recorded in a backup region of a cassette tape, and the information recorded in the backup region is re-recorded on the disc when the information cannot be read from the disc. When a free space of the disc runs out, the information with low access frequency that matches conditions set in advance is deleted from the disc, the same information recorded in the backup region is moved to a record holding region of the same cassette tape, and different information is recorded in the free space formed on the disc. The conditions for deleting the information include a recorded date being old, there being no plan for use at the moment, and the like.

In the disc devices of aforementioned Japanese Unexamined Patent Publications, when the information recorded on the disc is not the information recorded with the disc device, if the damaged portion from which the information cannot be normally read exists in the disc, correct reproduction cannot be performed since the information for complementing the recorded information in the damaged portion is not held in the alternate sector or memory etc. Furthermore, when the free space runs out in the recording region of the disc or cassette tape for recording the complementary information, new useful complementary information cannot be recorded.

SUMMARY OF THE INVENTION

In view of the above problems, it is an object of the present invention to provide a disc device capable of normally reproducing recorded information on a disc type recording medium while complementing the recorded information in a damaged portion of the recording medium with complementary information, and capable of constantly holding useful complementary information.

The present invention provides a disc device for reading and reproducing information recorded on a disc type recording medium, the device including: an acquiring means for externally acquiring complementary information for complementing information recorded in a damaged portion from which information on the recording medium cannot be normally read; a storage means formed with a storage area for saving the complementary information; and a control means for reproducing the information recorded on the recording medium while complementing the information recorded in the damaged portion of the recording medium with the complementary information saved in the storage area, wherein, when a capacity of a free space not saving the information in the storage area is less than a capacity necessary for saving the new complementary information acquired by the acquiring means, the control means evaluates usefulness of the complementary information based on time elapsed from last referenced time, a reference count, and an acquisition required expense for the complementary information saved in the storage area, deletes the complementary information from the storage area in order of lower usefulness to enlarge the free space, and saves the new complementary information in the free space when the capacity of the free space becomes greater than or equal to a necessary capacity.

In the above, "Reference" is used as a synonym of access to information. "Usefulness" refers to a degree of usability of the information saved in the storage area.

In this manner, even when the recorded information on the disc type recording medium is recorded by another device and a damaged portion exists in the recording medium, the recorded information on the recording medium can be normally reproduced while complementing the recorded information in the damaged portion with the complementary information since the complementary information corresponding to the recorded information in the damaged portion is externally acquired by the acquiring means and saved in the storage area of the storage means. Furthermore, since the usefulness of the saved complementary information is evaluated based on the time elapsed from the last referenced time, the reference count, and the acquisition required expense when the free space in the storage area runs out such that new complementary information cannot be saved, the usefulness of the complementary information can be comprehensively evaluated in detail while taking attenuation due to non-referenced time and reference frequency and the reacquisition required expense into consideration. The complementary information with lower usefulness is deleted from the storage area to sufficiently enlarge the free space, and the new complementary information is saved in the fee space, and thus useful complementary information can be constantly held in the storage area. In particular, useful complementary information with a high possibility of being re-referenced and useful complementary information with a high acquisition required expense are prevented from being deleted, and thus reacquisition occurrence frequency and a reacquisition required expense for the complementary information can be suppressed low. Moreover, when reproducing the recorded information on the recording medium with high reproduction frequency, the recorded information in the damaged portion of the recording medium can be complemented with the corresponding useful complementary information saved in the storage area, and thus reproduction of the recorded information on the recording medium can be normally and smoothly performed without requiring the complementary information to be externally acquired by the acquiring means for every reproduction.

According to one embodiment of the present invention, in the above-mentioned disc device, when the capacity of the free space in the storage area is less than the necessary capacity, the control means evaluates the usefulness of the complementary information saved in the storage area in recording medium units, and deletes the complementary information from the storage area in the recording medium units in order of lower usefulness to enlarge the free space.

In this manner, since the useful complementary information is constantly held in the storage area in recording medium units, reproduction can be normally and smoothly performed by rapidly complementing the recorded information in all the damaged portions of the recording medium respectively with the corresponding complementary information when reproducing the recorded information on the corresponding recording medium. Furthermore, since the non-useful complementary information can be collectively deleted from the storage area in recording medium units, the free space in the storage area can be greatly and continuously enlarged at once as the greater the number of information to be deleted. Thus, the new complementary information can be continuously recorded in the free space of the storage area, and when reproducing the recorded information on the recording medium, the recorded information in the corresponding damaged portion can be smoothly complemented by reading the complementary information continuously from the storage area.

According to one embodiment of the present invention, in the above-mentioned disc device, the control means saves in the storage area management information for managing the damaged portion and the complementary information and complementing the information in the damaged portion, and when the capacity of the free space in the storage area is less than the necessary capacity; evaluates usefulness of damaged portion information contained in the management information corresponding to the complementary information based on the time elapsed from the last referenced time, the reference count, and the acquisition required expense for the complementary information saved in the storage area, and deletes the damaged portion information from the storage area in order of lower usefulness to enlarge the free space.

Accordingly, the useful damaged portion information can be constantly held in the storage area since the damaged portion information with lower usefulness is deleted from the storage area. When the capacity of the free space in the storage area runs out even when all the complementary information is deleted from the storage area, the damaged portion information with lower usefulness is deleted from the storage area to enlarge the free space, so that new useful complementary information can be saved.

According to one embodiment of the present invention, in the above-mentioned disc device, when the capacity of the free space in the storage area is less than the necessary capacity, the control means evaluates usefulness of the damaged portion information saved in the storage area in recording medium units, and deletes the damaged portion information from the storage area in the recording medium units in order of lower usefulness to enlarge the free space.

Accordingly, the useful damaged portion information can be constantly held in the storage area in recording medium units, and thus, when reproducing the recorded information on the corresponding recording medium, the recorded information in all the damaged portions of the recording medium is respectively complemented with the complementary information based on the corresponding damaged portion information and reproduction can be normally performed. Furthermore, since the non-useful damaged portion information can be collectively deleted from the storage area in recording medium units, the free space in the storage area can be greatly and continuously enlarged at once as the greater the number of damaged portion information to be deleted.

According to one embodiment of the present invention, in the above-mentioned disc device, the control means collects the dispersed free spaces so as to be continuous, when the capacity of the free space in the storage area becomes greater than or equal to the necessary capacity by deletion of information from the storage area, and saves the new complementary information in the free space.

In this manner, even when the free spaces in the storage area are enlarged in a dispersed state by deletion of the complementary information and the damaged portion information from the storage area, the dispersed free spaces are collected and the new complementary information can be reliably and continuously recorded. Thus, when reproducing the recorded information on the recording medium, the complementary information is reliably and continuously read from the storage area, and the recorded information in the corresponding damaged portion can be constantly and smoothly complemented.

According to one embodiment of the invention, the disc device further includes a setting means for selecting information saved in the storage area and setting to forcibly hold the information.

Accordingly, the necessary complementary information and the damaged portion information to be reliably re-referenced and be necessarily left are prevented from being deleted irrespective of an evaluation result of usefulness.

Furthermore, one embodiment of the present invention provides a disc device for reading and reproducing video and sound information recorded on an optical disc, the device including: an acquiring means for acquiring complementary information through network communication from a server storing the complementary information for complementing information recorded in a damaged portion from which the information on the optical disc cannot be normally read; a control means for reproducing the information recorded on the optical disc while complementing the information recorded in the damaged portion of the optical disc with the complementary information; a storage means formed with a storage area for saving the complementary information acquired by the acquiring means and management information for managing the damaged portion and the complementary information and complementing the information in the damaged portion; and a setting means for selecting the information saved in the storage area and setting to forcibly hold the information, wherein, when information cannot be normally read from the optical disc, the control means acquires the complementary information of the corresponding damaged portion from the server by the acquiring means, and when a capacity of a free space not saving the information in the storage area is less than a capacity necessary for saving the acquired new complementary information, evaluates usefulness of the complementary information and usefulness of damaged portion information contained in the management information corresponding to the complementary information respectively based on time elapsed from last referenced time, a reference count, and an acquisition required expense for the complementary information saved in the storage area, and firstly deletes the complementary information from the storage area in order of lower usefulness to enlarge the free space, then deletes the damaged portion information from the storage area in order of lower usefulness to enlarge the free space, and collects the dispersed free spaces so as to be continuous to save the new complementary information in the free space when the capacity of the free space becomes greater than or equal to the necessary capacity.

In this manner, the recorded information on the optical disc can be normally reproduced while complementing the recorded information in the damaged portion with the complementary information, since the complementary information corresponding to the recorded information in the damaged portion of the optical disc is acquired from the server through network communication to be saved in the storage area. Furthermore, since the usefulness of the saved complementary information and the damaged portion information is evaluated based on the time elapsed from the last referenced time, the reference count, and the acquisition required expense when the free space in the storage area runs out, the usefulness of the complementary information and the damaged portion information can be comprehensively evaluated in detail taking attenuation by non-referenced time and reference frequency of the complementary information and a reacquisition required expense into consideration. The complementary information with lower usefulness is deleted and the damaged portion information with lower usefulness is deleted as necessary to sufficiently enlarge the free space, so that the new complementary information can be saved in the free space and the useful complementary information can be constantly held in the storage area. In particular, reacquisition occurrence frequency and the reacquisition required expense for the information can be suppressed low and occurrence of inefficient communication with the server can be prevented since the useful complementary information and damaged portion information with a high possibility of being re-referenced as well as useful complementary information and damaged portion information with a high acquisition required expense are prevented from being deleted. When reproducing the recorded information on the optical disc with high reproduction frequency, the recorded information in the damaged portion of the optical disc can be complemented with the corresponding useful complementary information saved in the storage area, and thus the complementary information does not need to be acquired from the server for every reproduction, and reproduction of the recorded information on the optical disc can be normally and smoothly performed. Even when the free spaces in the storage area enlarge in a dispersed state by deletion of the complementary information and the damaged portion information from the storage area, the dispersed free spaces are collected so as to be continuous, and thus new complementary information can be reliably and continuously recorded in the free space. Thus, when reproducing the recorded information on the optical disc, the recorded information in the corresponding damaged portion can be constantly and smoothly complemented by reliably and continuously reading the complementary information from the storage area. Since the necessary complementary information and damaged portion information to be reliably re-referenced and be necessarily left are set to be forcibly held out of the information saved in the storage area, the complementary information and the damaged portion information can be reliably prevented from being deleted irrespective of a evaluation result of usefulness.

According to the present invention, the recorded information on the recording medium can be normally reproduced while complementing the recorded information in the damaged portion with the complementary information since the complementary information corresponding to the recorded information in the damaged portion of the disc type recording medium is externally acquired and saved in the storage area of the storage means. Furthermore, when the free space in the storage area runs out, the usefulness of the saved complementary information is evaluated and the complementary information with lower usefulness is deleted, so that new complementary information can be saved in the enlarged free space and useful complementary information can be constantly held.

BRIEF DESCRIPTION OF THE DRAWINGS

FIG. 2 is a view showing a damaged portion information management table;

FIG. 3 is a view showing a damaged portion information table corresponding to one optical disc;

FIG. 5 is a view showing an evaluation formula and change of usefulness of the complementary information;

FIG. 7 is a view showing an evaluation formula and change of usefulness of another complementary information;

FIG. 8 is a view showing an evaluation formula and change of usefulness of another damaged portion information;

DETAILED DESCRIPTION OF THE PREFERRED EMBODIMENTS

Figure 1:
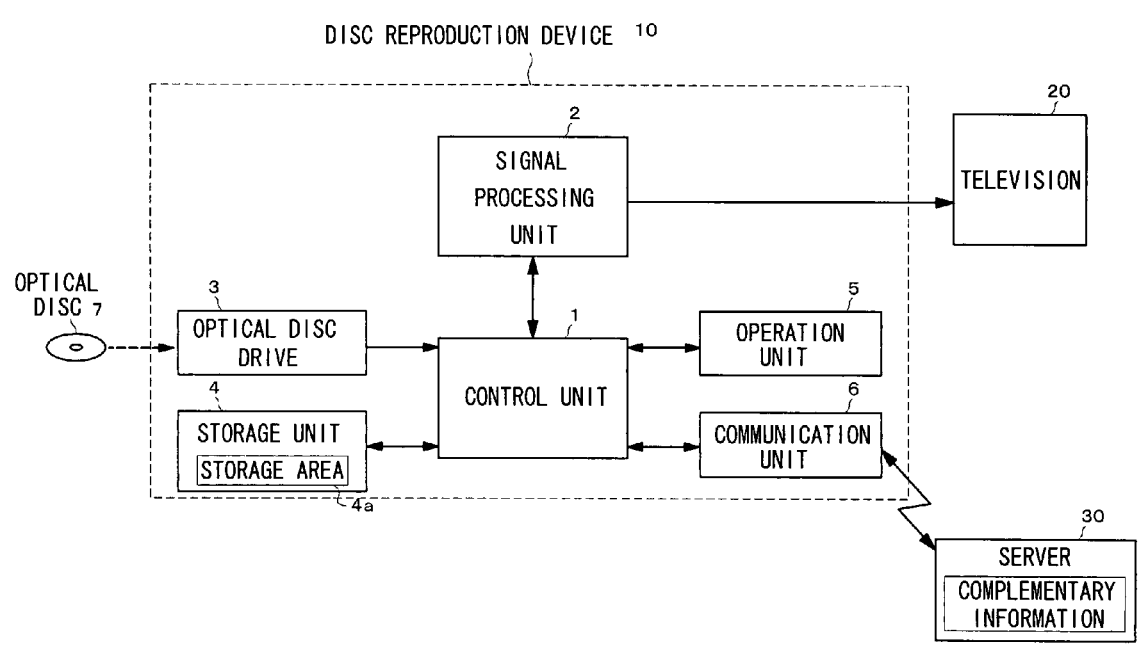
FIG. 1 is a block diagram of a disc device according to an embodiment of the present invention.

FIG. 1 is a block diagram of a disc device 10 according to an embodiment of the present invention. The disc device 10 is configured by a hard disc mounted optical disc recorder. A control unit 1 of the disc device 10 is configured by a CPU, a ROM, a RAM, a non-volatile memory, a timer, and the like. The control unit 1 controls each unit of the disc device 10 based on a program and data stored in the ROM, the RAM, and the non-volatile memory. The control unit 1 counts date and time with the timer. A signal processing unit 2 is configured by a MPEG coding/decoding circuit, a digital/analog conversion circuit, and the like. An optical disc drive 3 is configured by an optical pickup, a driving circuit thereof, and the like. The optical disc drive 3 reads and writes video and sound information with respect to an optical disc 7 such as a DVD and a Blu-ray disc. The optical disc 7 is an example of a disc type recording medium. A storage unit 4 is configured by a hard disc. An operation unit 5 is configured by an operation panel arranged in a main body of the disc device 10, a remote controller, and a remote control signal receiving circuit. Various operation keys are arranged on the operation panel and the remote controller. A communication unit 6 is configured by a network card, a modem, or the like.

When a user loads the optical disc 7 to the optical disc drive 3 and instructs reproduction through key operation of the operation unit 5, the control unit 1 reads the video and sound information recorded on the optical disc 7 by means of the optical disc drive 3, reproduces the information by means of the signal processing unit 2, and outputs the same to a television 20. Specifically, digital data compressed in the MPEG format read from the optical disc 7 is decoded by the signal processing unit 2, and an analog video signal and an analog sound signal are reproduced and output to the television 20. The control unit 1 processes image data recorded in an embedded memory or the storage unit 4 by the signal processing unit 2 so as to be on-screen displayed, and outputs the processed data to the television 20. The television 20 is connected to the disc device 10 through a cable etc. The television 20 displays on the embedded display a video based on the video signal input from the signal processing unit 2, and outputs from an embedded speaker a sound based on the sound signal input from the signal processing unit 2.

The disc device 10 and a server 30 are connected to a network such as the Internet, a Local Area Network, and a home network. The server 30 stores complementary information for complementing information recorded on the optical disc 7 in a storage region arranged in a storage device embedded therein. Only one server 30 may be installed, or a plurality of servers 30 may be installed. The control unit 1 performs network communication by means of the communication unit 6 with the server 30 storing the complementary information corresponding to the optical disc 7 in a case of reading error when information cannot be normally read from the optical disc 7. An address of the server 30 storing the complementary information corresponding to the optical disc 7 is recorded, for example, on the optical disc 7, and is read by the optical disc drive 3. The address of the server 30 may alternatively be written, for example, in an instruction book of the optical disc 7 so as to be input to the disc device 10 through key operation of the operation unit 5.

The control unit 1 transmits to the server 30 an ID i.e. identification information of the optical disc 7 and the address of a damaged portion from which the information of the optical disc 7 cannot be normally read. The ID of the optical disc 7 is recorded, for example, on the optical disc 7, and read by the optical disc drive 3. When receiving the ID of the optical disc 7 and the address of the damaged portion from the disc device 10, the server 30 notifies to the optical disc device 10 a stored position, in the server 30, of the complementary information corresponding to the damaged portion of the optical disc 7. The stored position in the server 30 is the address of the storage region of the storage device embedded in the server 30. The control unit 1 acquires the complementary information from the stored position in the server 30 notified from the server 30, and saves the information in a storage area 4a provided in the storage unit 4.

The control unit 1 also saves in the storage area 4a management information for managing the damaged portion of the optical disc 7 and the complementary information and complementing the information in the damaged portion. The control unit 1 reads the complementary information from the storage area 4a based on the management information saved in the storage area 4a, and reproduces the recorded information on the optical disc 7 while complementing the recorded information in the damaged portion of the optical disc 7 with the complementary information. The control unit 1 evaluates usefulness of the complementary information and usefulness of damaged portion information contained in the management information corresponding to the complementary information respectively based on time elapsed from last referenced time, a reference count, and an acquisition required expense for the complementary information saved in the storage area 4a. Reference is used as a synonym of access to information. Usefulness is a degree of usability of information saved in the storage area 4a.

The control unit 1 configures one embodiment of a control means in the present invention. The control unit 1 and the communication unit 6 configure one embodiment of an acquiring means in the present invention. The storage unit 4 configures one embodiment of a storage means in the present invention. The control unit 1 and the operation unit 5 configure one embodiment of a setting means in the present invention.

Figure 4:
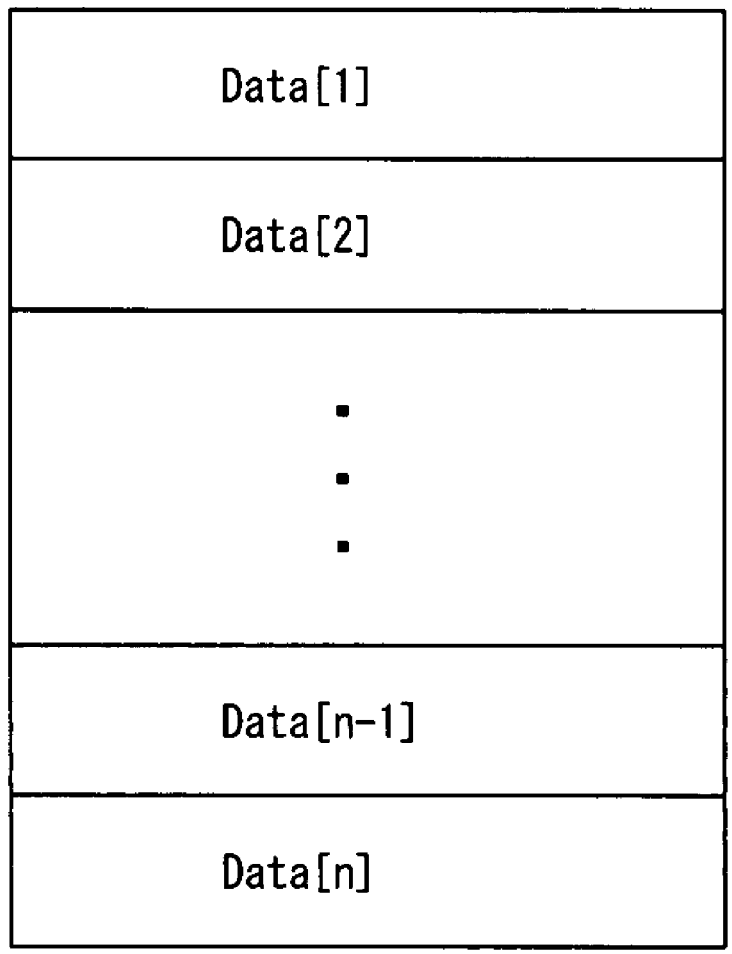
FIG. 4 is a view showing complementary information corresponding to the one optical disc.

FIG. 2 is a view showing a damaged portion information management table. FIG. 3 is a view showing a damaged portion information table corresponding to one optical disc 7. FIG. 4 is a view showing complementary information corresponding to the one optical disc 7. Information in the damaged portion information management table and the damaged portion information table as well as the damaged portion complementary information are saved in the storage area 4a by the control unit 1. The information in the damaged portion information management table and the damaged portion information table constitute the management information described above.

The damaged portion information management table of FIG. 2 is for management of the information in the damaged portion information table in the optical disc 7 units. "The number of damaged portion information held" indicates the number of damaged portion information contained in the damaged portion information table. "Disc_ID[1] to [n]" each indicates the ID of the optical disc 7 from which a damaged portion is detected. "table_point[1] to [n]" each indicates a saved position in the storage area 4a of the information in the damaged portion information table corresponding to each of the optical disc 7.

The damaged portion information table of FIG. 3 is for management of all the damaged portion information corresponding to one optical disc 7 and all the complementary information. "Disc_ID[1]" shows that this damaged portion information table corresponds to the optical disc 7 of ID[1]. "Server address storing complementary information" indicates the address of the server 30 storing the complementary information corresponding to the optical disc 7 of ID[1]. "Effective data transfer rate" indicates an actual transfer rate in a case of acquiring the corresponding complementary information from the server 30. "Map element number" indicates the number of damaged portion information contained in the "mapping table". Information recorded on each column of the "mapping table" is the respective damaged portion information. The damaged portion information is for management of the damaged portion of the optical disc 7 and the complementary information saved in the storage area 4a corresponding to the damaged portion. The damaged portion information is collectively saved in the storage area 4a for every optical disc 7.

"address [1] to [n]" contained in the damaged portion information respectively indicates the address of each damaged portion in the optical disc 7 of ID[1]. "data_point[1] to [n]" each indicates the saved position in the storage area 4a of the complementary information corresponding to each damaged portion. "data_size[1] to [n]" each indicates a data size (capacity) of each complementary information. "Reference counts [1] to [n]" each indicates the reference count from each complementary information being saved in the storage area 4a up to the present. Immediately after the complementary information is saved in the storage area 4a, the reference count becomes one. "Last referenced time [1] to [n]" each indicates the last (most recent) time when each complementary information is referenced. Immediately after the complementary information is saved in the storage area 4a, the last referenced time becomes the storage completed time. "lock" or "unlock" indicates whether or not to forcibly hold each complementary information and each damaged portion information saved in the storage area 4a so as not to be deleted. Through key operation of the operation unit 5, all of the complementary information and the damaged portion information saved in the storage area 4a are on-screen displayed on the display of the television 20, then one of the complementary information and one of the damaged portion information are selected, and whether or not to forcibly hold is set.

FIG. 4 shows complementary information corresponding to each damaged portion on the optical disc 7 of ID[1]. "Data_[1] to [n]" are pieces of complementary information respectively shown on "data_point[1] to [n]" in the "mapping table" of FIG. 3. The pieces of complementary information are collectively saved in the storage area 4a for every optical disc 7. When reproducing the recorded information on the optical disc 7 having the complementary information corresponding to the existing damaged portion held in the storage area 4a, upon reaching the damaged portion, the control unit 1 reads the complementary information corresponding to the damaged portion from the storage area 4a by referencing in order the information in the damaged portion management information table and the information in the damaged portion information table, and continues reproduction while complementing the recorded information in the damaged portion with the complementary information.

Generally, the optical disc 7 is frequently used immediately after being obtained, and the frequency of use lowers with elapse in time, and thus the usage rate tends to decrease. The usage rate of the optical disc 7 lowers extremely till a certain period and then gradually lowers after a certain period, and thus such decrease tends not to be like a proportional-function. When a usage rate P of such optical disc 7 is represented in a function with elapsed time Dt from the last referenced time as a variable, an exponential function $P=p^{\wedge Dt} \cdot (1-p)$ which assumes as an independent event occurring at a possibility of 1-p, or a logarithmic function $P=-\log_a(Dt)$ etc. are given as candidates. Since a reference rate of the complementary information and the damaged portion information saved in the storage area 4a will also change as described above, usefulness of the complementary information and the damaged portion information can be calculated and evaluated by applying the above functions.

FIG. 5 is a view showing an evaluation formula and change of the usefulness of the complementary information. In the present example, usefulness α of each complementary information saved in the storage area 4a is calculated from the following (also shown in FIG. 5) evaluation formula.

$$\alpha = \{(a+Refcnt)/n\}^{\wedge Dt} \times D_{size} \div T_{rate}$$

In the above evaluation formula, a is a constant defining an initial value of the reference probability of the complementary information. n is a constant defining gradation of the usefulness α. The constants a and n are greater than or equal to 0, and the constant n is greater than or equal to the constant a. The complementary information reference count Refcnt (abbreviation of Reference Count) is set to the same value as the actual reference count when the actual reference count of the complementary information to be evaluated is smaller than n−a, while is set to n−a−1 when the actual reference count is greater than or equal to n−a. The conditions are set so that (a+Refcnt)/n becomes greater than 0 and smaller than 1 (0<(a+Refcnt)/n<1). The elapsed time Dt from the last referenced time for the complementary information corresponds to time from the last referenced time for the complementary information to the computation implemented time of usefulness. The actual reference count, the last referenced time, a complementary information size $D_{size}$, and an effective data transfer rate $T_{rate}$ of the complementary information to be evaluated are read from the relevant locations in the damaged portion information table (FIG. 3) corresponding to the complementary information. The computation implemented time of usefulness is detected by referencing the timer embedded in the control unit 1.

$\{(a+Refcnt)/n\}^{\wedge Dt}$ of the first term on the right side is the reference probability of the complementary information at the elapsed time Dt. The reference count Refcnt is added since the usefulness α becomes higher as the greater the reference count of the complementary information. The relevant first term is divided by the constant n so that the gradation of the usefulness α is in a predetermined range (e.g., 0 to 512 or two steps) that can be easily evaluated. The elapsed time Dt is a power function to decrease the reference probability with elapsed time Dt assuming the reference probability at a certain time point depends on the reference probability immediately before. Complementary information size $D_{size} \div$ effective data transfer rate $T_{rate}$ of the second and third terms on the right side is the acquisition required time (communication time) for acquiring the complementary information from the server 30. The acquisition required expense for acquiring the complementary information from the server 30 depends on the acquisition required time, and thus is computed by assuming the acquisition required time as the acquisition required expense. As the acquisition required expense for the complementary information becomes higher, the usefulness α becomes higher, and thus $\{(a+Refcnt)/n\}^{\wedge Dt}$ of the first term on the right side is multiplied with $D_{size} \div T_{rate}$.

According to the above evaluation formula, immediately after saving the complementary information, the usefulness α of the complementary information is defined by being strongly subjected to the influence of $D_{size} \div T_{rate}$ assumed as the acquisition required expense. After a while, the usefulness α is defined by also being gradually subjected to the influence of the reference probability $\{(a+Refcnt)/n\}^{\wedge Dt}$, and lowers with increase in the elapsed time Dt as shown in Term 1 (Refcnt=1, Dt(1)) in the graph of FIG. 5. Furthermore, the usefulness α increases with increase in the reference count Refcnt as shown in Term 1 (Refcnt=1, Dt(1)) to Term 3 (Refcnt=3, Dt(3)).

Figure 6:
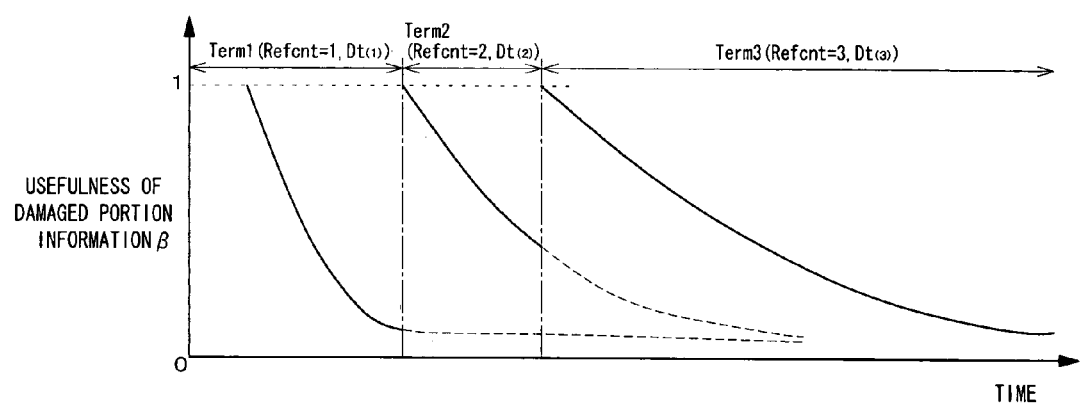
FIG. 6 is a view showing an evaluation formula and change of usefulness of damaged portion information.

FIG. 6 is a view showing an evaluation formula and change of usefulness of the damaged portion. In the present example, usefulness β of each damaged portion information saved in the storage area 4a is calculated from the following (also shown in FIG. 6) evaluation formula.

$$\beta = \{(a+Refcnt)/n\}^{\wedge Dt} \times D_{size}$$

The evaluation formula of the usefulness β of the damaged portion information is as described above except that computation of the effective data transfer rate $T_{rate}$ is excluded from the evaluation formula of the usefulness a of the complementary information. The acquisition required expense for acquiring the damaged portion information depends on the required time for reading the complementary information from the storage area 4a in order to obtain the damaged portion information. The required time for the reading operation is proportional to the size of the complementary information to be read when simply considering the reading operation not including access time to the address of the reading destination. Thus, the complementary information size $D_{size}$ is assumed as the acquisition required expense, and multiplied to the reference probability $\{(a+Refcnt)/n\}^{\wedge Dt}$.

According to the above evaluation formula, immediately after saving the damaged portion information, the usefulness β of the damaged portion information is defined by being strongly subjected to the influence of $D_{size}$ assumed as the acquisition required expense. After a while, the usefulness β is defined by also being gradually subjected to the influence of the reference probability $\{(a+Refcnt)/n\}^{\wedge Dt}$, and lowers with increase in the elapsed time Dt as shown in Term 1 (Refcnt=1, Dt(1)) in the graph of FIG. 6. Furthermore, the usefulness β increases with increase in the reference count Refcnt as shown in Term 1 (Refcnt=1, Dt(1)) to Term 3 (Refcnt=3, Dt(3)).

There has been described the example of applying the exponential function to the evaluation formulas of the usefulness α and β of the complementary information and the damaged portion information, but a logarithmic function may be applied instead of the exponential function. In this case, the evaluation formulas of the usefulness α and β of the complementary information and the damaged portion information are obtained, for example, from the following (also shown in FIGS. 7 and 8) formulas.

$$\alpha = -\log_a(Dt) \times T_{rate} \div D_{size} \div Refcnt$$

$$\beta = -\log_a(Dt) \div Refcnt$$

In the above evaluation formulas, $-\log_a(Dt)$ of the first term on the right side of the usefulness α and β is the reference probability of the complementary information at the elapsed time Dt. The base a is greater than or equal to 1. In the second and third terms on the right side of the usefulness α, effective data transfer rate $T_{rate}$÷complementary information size $D_{size}$, which is an inverse number of the acquisition required time assumed as the acquisition required expense for the complementary information, is multiplied. The fourth term on the right side of the usefulness α and the second term on the right side of the usefulness β are respectively divided by the reference count Refcnt of the complementary information. According to the above evaluation formulas, the usefulness α and β of the complementary information and the damaged portion information lower with increase in the elapsed time Dt, as shown in Term 1 (Refcnt=1, Dt(1)) in the graphs of FIG. 7 and FIG. 8. Furthermore, the usefulness α and β increase with increase in the reference count Refcnt as shown in Term 1 (Refcnt=1, Dt(1)) to Term 3 (Refcnt=3, Dt(3)).

Figure 9:
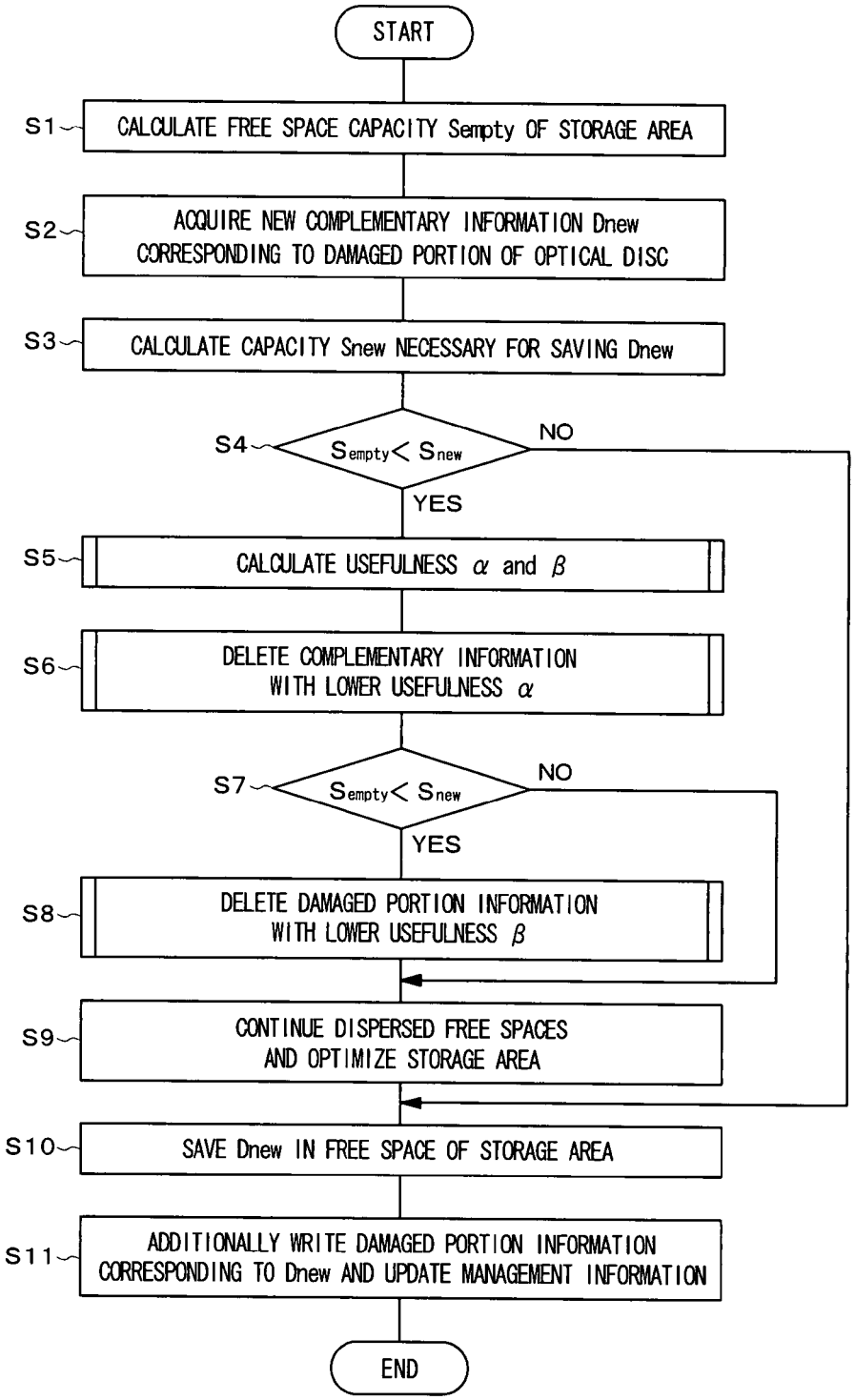
FIG. 9 is a flowchart showing a procedure of a complementary information saving process.

FIG. 9 is a flowchart showing a procedure of a complementary information saving process executed in the disc device 10. First, the control unit 1 calculates a capacity $S_{empty}$ of the free space not saving information in the storage area 4a of the storage unit 4 (step S1). Thereafter, the control unit 1 acquires new complementary information $D_{new}$ corresponding to the damaged portion of the optical disc 7 from the server 30 by the communication unit 6 as described above (step S2), and calculates a capacity $S_{new}$ necessary for saving the new complementary information $D_{new}$ (step S3). When the capacity $S_{empty}$ is greater than or equal to the capacity $S_{new}$ (step S4: NO), the control unit 1 saves the new complementary information $D_{new}$ in the free space of the storage area 4a (step S10). Furthermore, the control unit 1 additionally writes the damaged portion information corresponding to the new complementary information $D_{new}$ to the management information saved in the storage area 4a, that is, the damaged portion information management table (FIG. 2) and the damaged portion information table (FIG. 3), updates the management information (step S11), and ends the process.

Specifically, in step S11, when other management information is already held in the storage area 4a for the optical disc 7 corresponding to the new complementary information $D_{new}$, the control unit 1, for example, additionally writes the damaged portion information on the new complementary information $D_{new}$ to the mapping table of the damaged portion information table corresponding to the optical disc 7, and updates the map element number in the damaged portion information table and the number of the damaged portion information held in the damaged portion information management table. When other management information is not held in the storage area 4a for the optical disc 7 corresponding to the new complementary information $D_{new}$, a damaged portion information table corresponding to the optical disc 7 is created for example, information in the damaged portion information table is saved in the storage area 4a, the saved position of the damaged portion information table and the ID of the optical disc 7 are additionally written in the damaged portion information management table, and the number of the damaged portion information held in the damaged portion information management table is updated.

Figure 10:
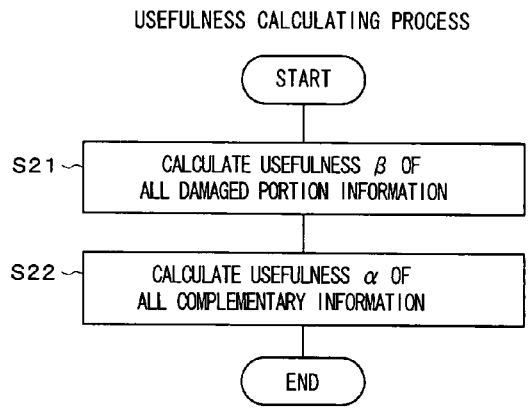
FIG. 10 is a flowchart showing a procedure of a usefulness calculating process.

In step S4, when the capacity $S_{empty}$ is less than the capacity $S_{new}$ (step S4: YES), the control unit 1 calculates the usefulness α and β of the complementary information and the damaged portion information (step S5). FIG. 10 is a flowchart showing a detailed procedure of a usefulness calculating process in step S5 of FIG. 9. The control unit 1 first calculates the usefulness β of all the damaged portion information saved in the storage area 4a according to the above-described evaluation formula (step S21), and calculates the usefulness α of all the complementary information saved in the storage area 4a (step S22). The control unit 1 records the calculated usefulness α and β in the embedded memory etc., and ends the usefulness α and β calculating process.

Figure 11:
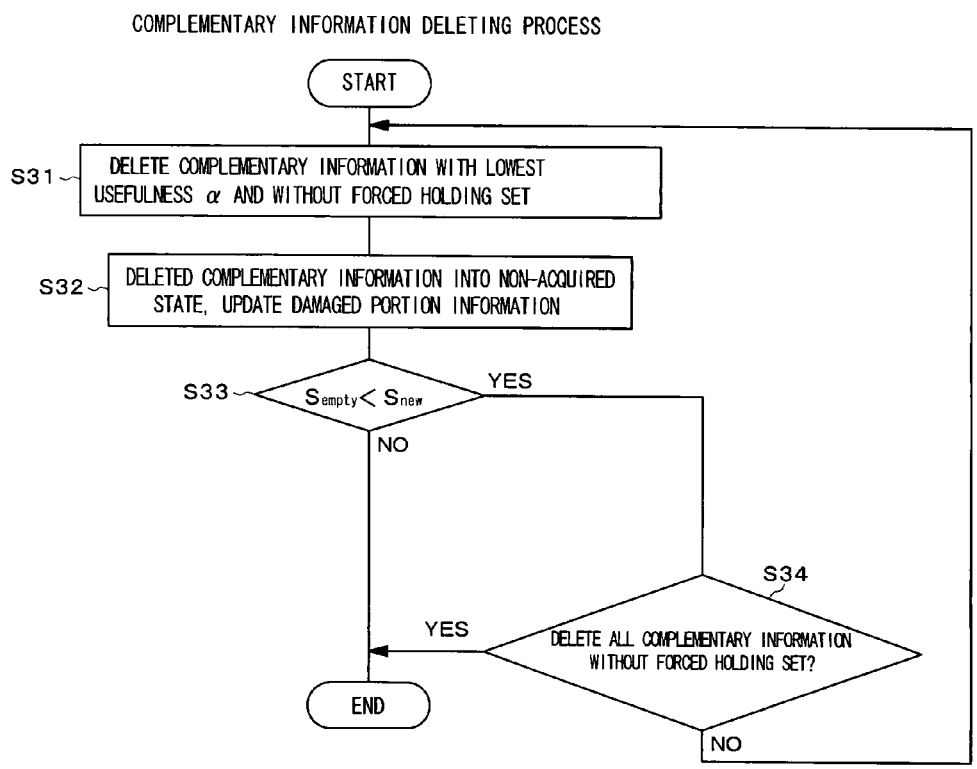
FIG. 11 is a flowchart showing a procedure of a complementary information deleting process.

The control unit 1 then deletes the complementary information with lower usefulness α (step S6 of FIG. 9). FIG. 11 is a flowchart showing a detailed procedure of a complementary information deleting process in step S6 of FIG. 9. First, the control unit 1 deletes from the storage area 4a the complementary information with the lowest usefulness α and not set to be forcibly held, that is, "lock" being not contained in the corresponding damaged portion information, out of all the saved complementary information (step S31). The control unit 1 then updates the damaged portion information corresponding to the complementary information so that the deleted complementary information is in a non-acquired state (step S32). Specifically, the control unit 1 clears (erases) the content other than "address[1] to [n]" in the damaged portion information corresponding to the deleted complementary information.

The control unit 1 again calculates the capacity $S_{empty}$ of the free space in the storage area 4a, and when the capacity $S_{empty}$ is less than the capacity $S_{new}$ (step S33: YES) and all the complementary information without forced holding set is not deleted (step S34: NO), further the complementary information with the lowest usefulness α and without forced holding set is deleted from the storage area 4a (step S31), and steps S32 to S34 are repeatedly executed. In step S33, when the re-calculated capacity $S_{empty}$ becomes greater than or equal to the capacity $S_{new}$ (step S33: NO), or when the capacity $S_{empty}$ is less than the capacity $S_{new}$ (step S33: YES) and all the complementary information without forced holding set is deleted (step S34: YES), the control unit 1 ends the complementary information deleting process.

When the capacity $S_{empty}$ is greater than or equal to the capacity $S_{new}$ (step S7 of FIG. 9: NO), the control unit 1 collects the dispersed free spaces in the storage area 4a so as to be continuous to optimize the storage area 4a (step S9). The control unit 1 then saves the new complementary information $D_{new}$ in the free space of the storage area 4a (step S10), additionally writes the damaged portion information corresponding to the new complementary information $D_{new}$ to the management information in the storage area 4a to update the management information (step S11), and ends the process.

Figure 12:
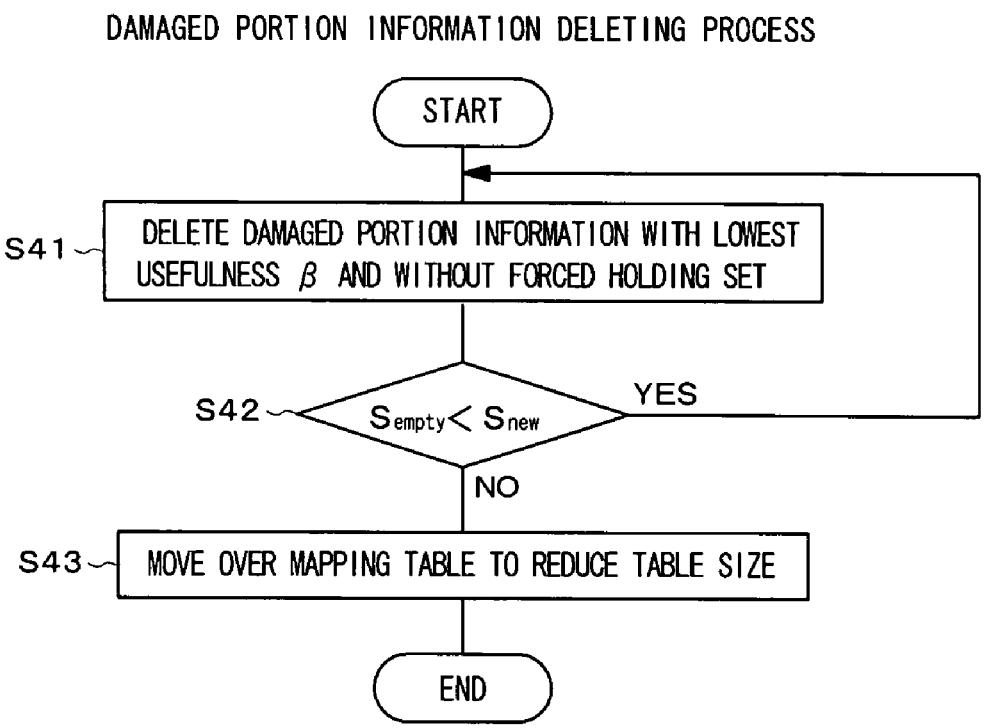
FIG. 12 is a flowchart showing a procedure of a damaged portion information deleting process.

In step S7, when the capacity $S_{empty}$ is less than the capacity $S_{new}$ (step S7: YES), the control unit 1 deletes the damaged portion information with lower usefulness β (step S8). FIG. 12 is a flowchart showing a detailed procedure of a damaged portion information deleting process in step S8 of FIG. 9. First, the control unit 1 deletes, out of all the saved damaged portion information, the damaged portion information with the lowest usefulness β and without the forced holding set from the mapping table contained in the corresponding damaged portion information table of the storage area 4a (step S41). Then the control unit 1 again calculates the capacity $S_{empty}$ of the free space in the storage area 4a. When the capacity $S_{emtpy}$ is less than the capacity $S_{new}$ (step S42: YES), the control unit 1 further deletes the damaged portion information with the lowest usefulness β and without the forced holding set from the corresponding mapping table of the storage area 4a (step S41), and repeatedly executes step S42.

In step S42, when the recalculated capacity $S_{empty}$ of the free space in the storage area 4a is greater than or equal to the capacity $S_{new}$ (step S42: NO), the control unit 1 moves over the mapping table from which the damaged portion information is deleted to reduce the table size (step S43), and ends the damaged portion information deleting process. The control unit 1 then collects the dispersed free spaces to optimize the storage area 4a (step S9 of FIG. 9), and saves the new complementary information $D_{new}$ in the free space (step S10). Furthermore, the control unit 1 additionally writes the damaged portion information corresponding to the new complementary information $D_{new}$ to the management information in the storage area 4a to update the management information (step S11), and ends the process.

According to the above-described manner, even when the recorded information on the optical disc 7 is recorded by the device other than the disc device 10 and a damaged portion exists in the optical disc 7, the recorded information on the optical disc 7 can be normally reproduced while complementing the recorded information in the damaged portion with the complementary information, since the complementary information corresponding to the damaged portion is acquired from the server 30 through network communication and saved in the storage area 4a of the storage unit 4.

Since the usefulness α and β of the saved complementary information and the damaged portion information are evaluated based on the time elapsed from the last referenced time, the reference count, and the acquisition required expense for the complementary information when the free space in the storage area 4a runs out such that the new complementary information cannot be saved, the usefulness α and β can be comprehensively evaluated in detail while taking attenuation due to non-referenced time and reference frequency of the complementary information and reacquisition required expense into consideration.

The useful complementary information can be constantly held in the storage area 4a since the complementary information with lower usefulness α is deleted from the storage area 4a to sufficiently enlarge the free space so that new complementary information can be saved in the free space. Furthermore, the useful damaged portion information can be constantly held in the stored area 4a since the damaged portion information with lower usefulness β is deleted from the storage area 4a. Moreover, when the capacity of the free space in the storage area 4a runs out even when all the complementary information are deleted from the storage area 4a, the damaged portion information with lower usefulness β is deleted from the storage area 4a to enlarge the free space and save the new complementary information, and thus constant holding of the useful complementary information can be more reliable.

In particular, since useful complementary information and damaged portion information having a high possibility of being re-referenced and useful complementary information and damaged portion information having a high acquisition required expense are prevented from being deleted, reacquisition occurrence frequency and reacquisition required expense for the information can be suppressed low, and occurrence of inefficient communication with the server 30 can be prevented. Furthermore, when reproducing the recorded information on the optical disc 7 having a high reproduction frequency, reproduction of the recorded information on the optical disc 7 can be normally and smoothly performed without acquiring the complementary information from the server 30 for every reproduction as the recorded information in the damaged portion of the optical disc 7 can be complemented with the corresponding useful complementary information saved in the storage area 4a.

Even when the free space in the storage area 4a is enlarged in a dispersed state due to deletion of the complementary information and damaged portion information from the storage area 4a, the new complementary information can be reliably and continuously recorded to the storage area 4a by collecting the dispersed free spaces. Thus, when reproducing the recorded information on the optical disc 7, the complementary information can be reliably and continuously read from the storage area 4a, and the recorded information in the corresponding damaged portion can be constantly smoothly complemented.

Furthermore, by setting to forcibly hold the necessary complementary information and the damaged portion information to be reliably re-referenced and be necessarily left out of the information saved in the storage area 4a, deletion of the complementary information and the damaged portion information can be reliably prevented irrespective of the evaluation result of the usefulness α and β.

Figure 13:
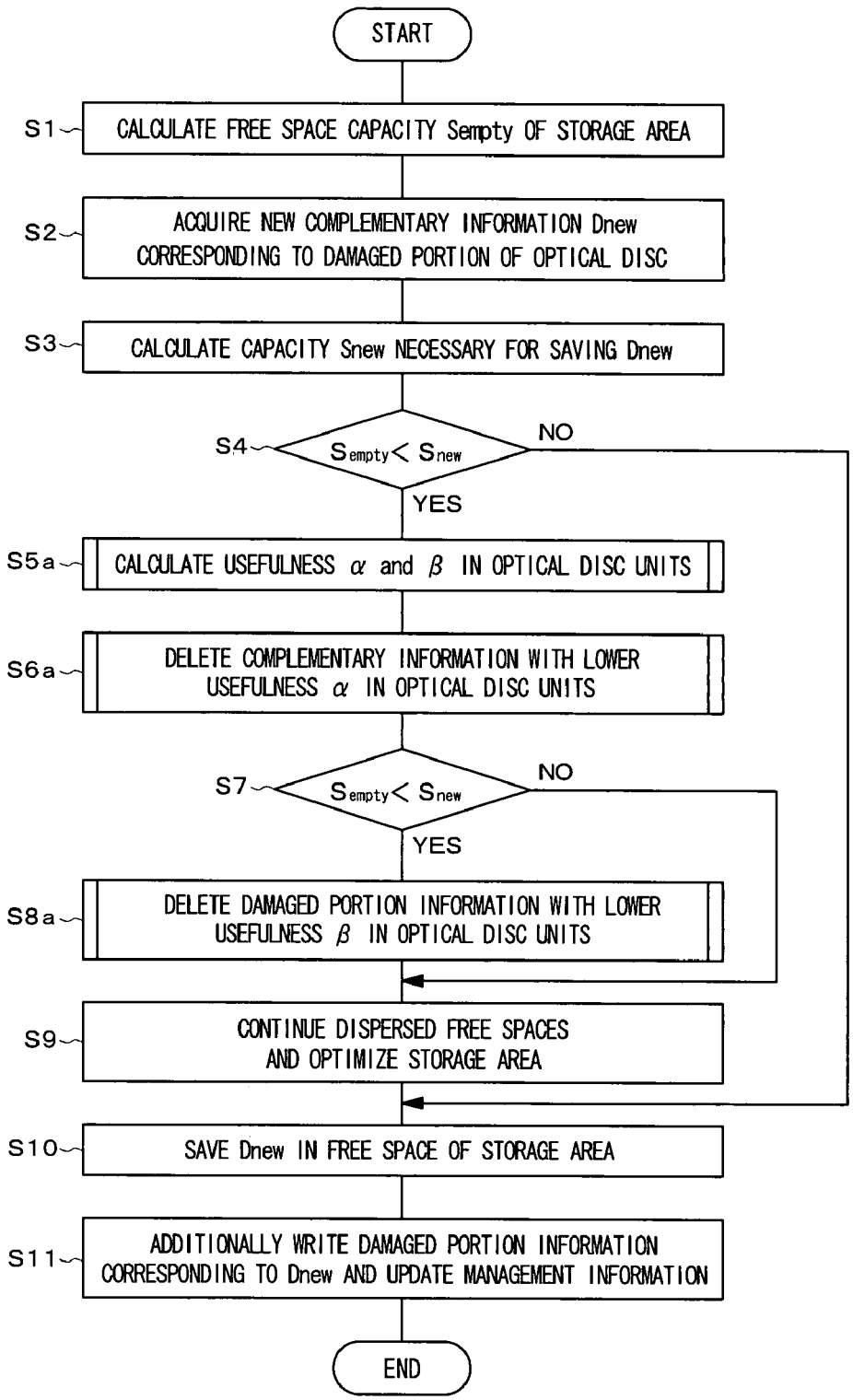
FIG. 13 is a flowchart showing a procedure of another complementary information saving process.

In the above description, an example in which evaluation of the usefulness α and β of the complementary information and the damaged portion information and deletion from the storage area 4a are carried out individually in information units has been described, but may be carried out in optical disc 7 units. FIG. 13 is a flowchart showing a procedure of a complementary information saving process for this case. In the figure, same reference numerals are denoted for the same steps as in FIG. 9. The control unit 1 calculates the capacity $S_{empty}$ of the free space in the storage area 4a (step S1), acquires the new complementary information $D_{new}$ from the server 30 (step S2), and calculates the capacity $S_{new}$ necessary for saving the new complementary information $D_{new}$ (step S3). Thereafter, when the capacity $S_{empty}$ of the free space is less than the capacity $S_{new}$ (step S4: NO), the control unit 1 calculates the usefulness α and β of the complementary information and the damaged portion information in optical disc 7 units (step S5a).

Figure 14:
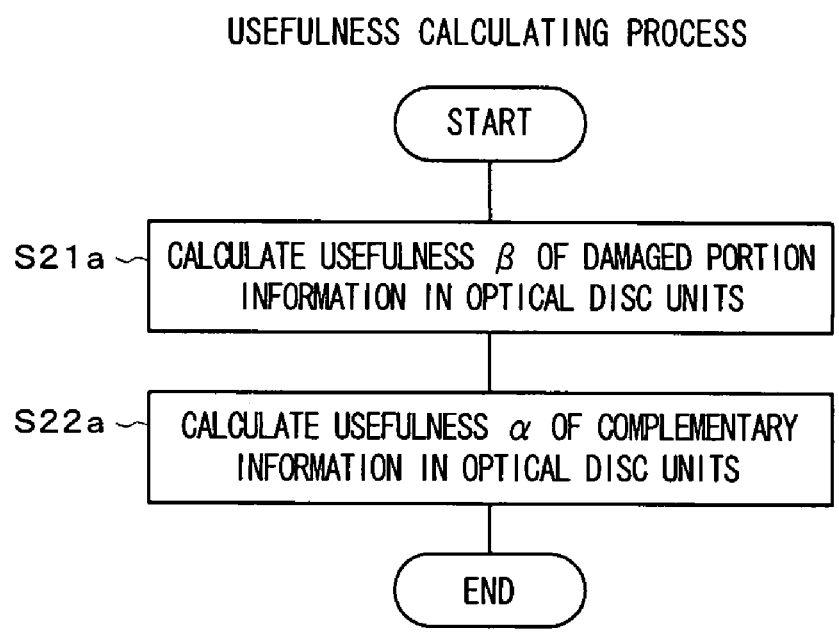
FIG. 14 is a flowchart showing a procedure of another usefulness calculating process.

FIG. 14 is a flowchart showing a detailed procedure of usefulness α and β calculating process in step S5a of FIG. 13. According to the aforementioned evaluation formula, the control unit 1 calculates the usefulness β of the damaged portion information saved in the storage area 4a in optical disc 7 units (step S21a), and calculates the usefulness α of the complementary information saved in the storage area 4a in optical disc 7 units (step S22a). Specifically, for example, the last referenced time for the recent complementary information, largest reference count of the complementary information, largest size $D_{size}$ of the complementary information, and the effective data transfer rate $T_{rate}$ are extracted from the information (FIG. 3) of the damaged portion information table corresponding to one optical disc 7. Next, the shortest elapsed time Dt from the last referenced time for the recent complementary information to the computation starting time of usefulness β or α is calculated. The complementary information reference count Refcnt is determined based on the largest reference count of the complementary information. Then, the values Dt, Refcnt, $D_{size}$, and $T_{rate}$ are applied to the aforementioned evaluation formula to calculate the usefulness β, α of the damaged portion information and the complementary information corresponding to one optical disc 7. The usefulness β, α of the damaged portion information and the complementary information corresponding to other optical disc 7 are also similarly calculated. In addition, for example, after calculating the usefulness β, α of each damaged portion information and each complementary information corresponding to each optical disc 7 respectively, the average value of usefulness β, α is calculated for each optical disc 7 respectively, and this average value may be set as the usefulness β, α of the damaged portion information and the complementary information corresponding to each optical disc 7.

Figure 15:
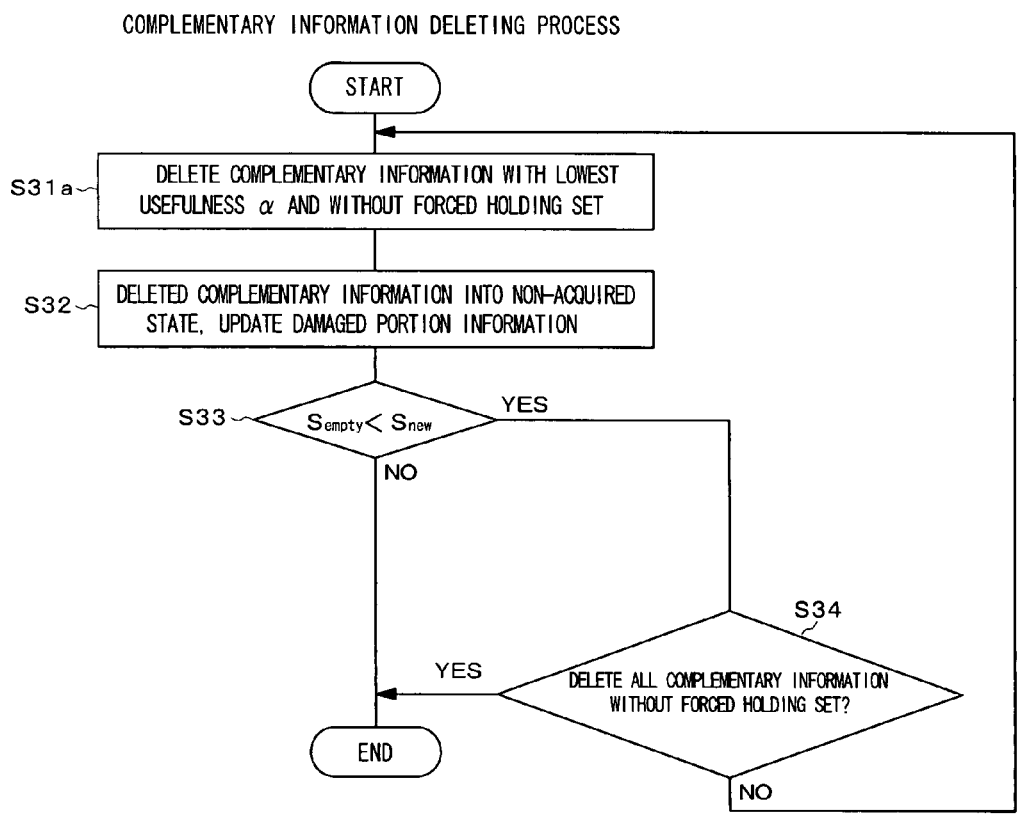
FIG. 15 is a flowchart showing a procedure of another complementary information deleting process.

After calculating the usefulness α and β of the complementary information and the damaged portion information in optical disc 7 units, the control unit 1 records the usefulness α and β in the embedded memory and the like, and terminates the usefulness α and β calculating process in disc units. The control unit 1 then deletes the complementary information with lower usefulness α in optical disc 7 units (step S6a of FIG. 13). FIG. 15 is a flowchart showing a detailed procedure of a complementary information deleting process in step S6a of FIG. 13. In the figure, same reference numerals are denoted for the same steps as in FIG. 11. First, the control unit 1 deletes all the complementary information on the optical disc 7 with the lowest usefulness α and without forced holding set from the storage area 4a (step S31a). The control unit 1 then updates the damaged portion information corresponding to the deleted complementary information (step S32), and repeatedly executes steps S31a to S34 when the recalculated capacity $S_{empty}$ is less than the capacity $S_{new}$ (step S33: YES), and when all the complementary information without forced holding set is not deleted (step S34: NO). The complementary information deleting process is terminated when the recalculated capacity $S_{empty}$ is greater than or equal to the capacity $S_{new}$ (step S33: NO) or when the capacity $S_{empty}$ is less than the capacity $S_{new}$ (step S33: YES) and all the complementary information without forced holding set is deleted (step S34: YES).

Figure 16:
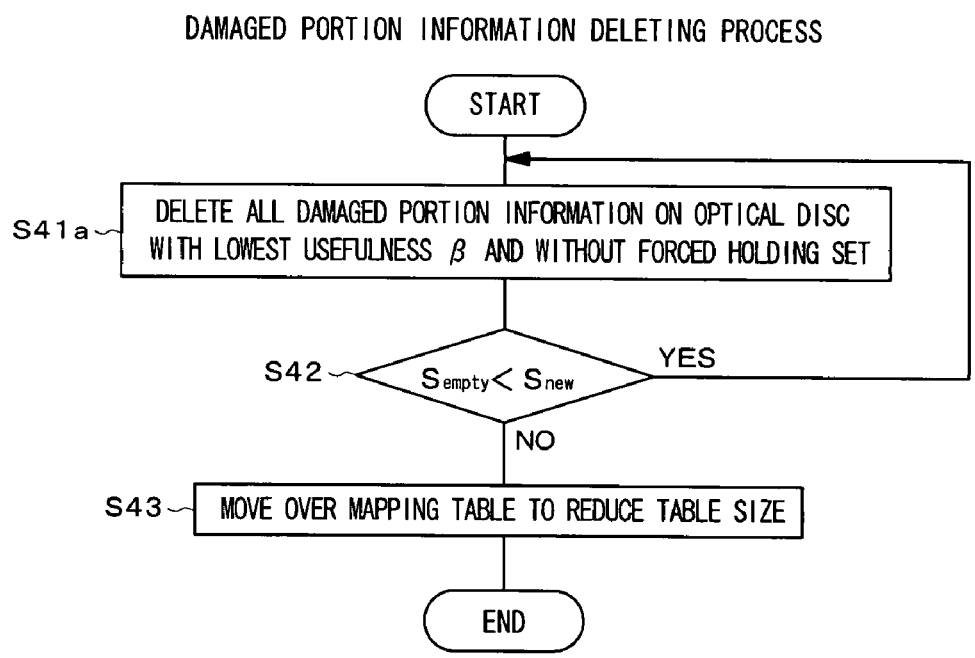
FIG. 16 is a flowchart showing a procedure of another damaged portion information deleting process.

When the capacity $S_{empty}$ is less than the capacity $S_{new}$ (step S7 of FIG. 13: YES), the control unit 1 deletes the damaged portion information with lower usefulness β in optical disc 7 units (step S8a). FIG. 16 is a flowchart showing a detailed procedure of a damaged portion information deleting process in step S8a of FIG. 13. In the figure, the same reference numerals are denoted for the same steps as in FIG. 12. First, the control unit 1 deletes all the damaged portion information on the optical disc 7 with the lowest usefulness β and without the forced holding set from the mapping table in the corresponding damaged portion information table of the storage area 4a (step S41a). The control unit 1 repeatedly executes steps S41a and S42 when the recalculated capacity $S_{empty}$ is less than the capacity $S_{new}$ (step S42: YES). When the recalculated capacity $S_{empty}$ is greater than or equal to the capacity $S_{new}$ (step S42: NO), the control unit 1 moves over the mapping table from which the damaged portion information is deleted to reduce the table size (step S43), and ends the damaged portion information deleting process. Thereafter, the control unit 1 collects the dispersed free spaces and optimizes the storage area 4a (step S9 of FIG. 13), and saves the new complementary information $D_{new}$ in the free space (step S10). Furthermore, the control unit 1 additionally writes the damaged portion information corresponding to the new complementary information $D_{new}$ to the management information in the storage area 4a, updates the management information (step S11), and ends the process.

In this manner, since the useful complementary information and the damaged portion information can be constantly held in the storage area 4a in optical disc 7 units, the recorded information in all damaged portions of the optical disc 7 can be rapidly complemented with the corresponding complementary information based on the corresponding damaged portion information, and thus reproduction can be normally and smoothly performed when reproducing the recorded information on the corresponding optical disc 7. Furthermore, since the non-useful complementary information and the damaged portion information can be collectively deleted from the storage area 4a in optical disc 7 units, the free space in the storage area 4a can be greatly and continuously enlarged at once the greater the number of information to be deleted. Thus, new complementary information can be continuously recorded in the free space of the storage area 4a, and by reading the complementary information continuously from the storage area 4a when reproducing the recorded information on the optical disc 7, the recorded information in the corresponding damaged portion can be smoothly complemented.

The present invention may take various forms other than the embodiment described above. For instance, in the above embodiment, evaluation of the usefulness α and β of the complementary information and the damaged portion information and deletion from the storage area 4a are carried out individually in information units and in optical disc 7 units, but the present invention is not limited these examples. Alternatively, evaluation of the usefulness of either the complementary information or the damaged portion information and deletion from the storage area may be carried out individually in information units, and evaluation of the usefulness of the other information and deletion from the storage area may be carried out in disc units.

Furthermore, in the above embodiment, there is described the example of complementing the recorded information in the damaged portion of the optical disc 7 with the complementary information saved in the storage area 4a of the storage unit 4 configured by the hard disc, but the present invention is not limited thereto. Alternatively, the recorded information in the damaged portion of the disc type recording medium such as a hard disc, a magnetic disc, or a magnetic optical disc can be complemented with the complementary information. The storage area may be provided in the storage means such as a memory IC or a memory module to save the management information including the damaged portion information and the complementary information.

In the above embodiment, there is described the example of applying the present invention to the disc device 10 configured by the hard disc mounted optical disc recorder, but the present invention is also applicable to disc devices such as an optical disc recorder, a hard disc recorder, a magnetic optical disc recorder, a complex machine thereof, and a complex machine of the above and a television, a video cassette recorder, or the like.

What is claimed is:

1. A disc device for reading and reproducing information recorded on a disc type recording medium, the device comprising:

an acquiring means for externally acquiring complementary information for complementing information recorded in a damaged portion from which information on the recording medium cannot be normally read;

a storage means formed with a storage area for saving the complementary information; and a control means for reproducing the information recorded on the recording medium while complementing the information recorded in the damaged portion of the recording medium with the complementary information saved in the storage area, wherein when a capacity of a free space not saving the information in the storage area is less than a capacity necessary for saving the new complementary information acquired by the acquiring means, the control means evaluates usefulness of the complementary information based on time elapsed from last referenced time, a reference count, and an acquisition required expense for the complementary information saved in the storage area, deletes the complementary information from the storage area in order of lower usefulness to enlarge the free space, and saves the new complementary information in the free space when the capacity of the free space becomes greater than or equal to the necessary capacity.

2. The disc device according to claim 1, wherein the control means evaluates the usefulness of the complementary information in recording medium units, and deletes the complementary information in recording medium units.

3. The disc device according to claim 1, wherein the control means saves in the storage area management information for managing the damaged portion and the complementary information and complementing the information in the damaged portion, and when the capacity of the free space in the storage area is less than the necessary capacity, the control means evaluates usefulness of damaged portion information contained in the management information corresponding to the complementary information based on the time elapsed from the last referenced time, the reference count, and the acquisition required expense for the complementary information saved in the storage area, and deletes the damaged portion information from the storage area in order of lower usefulness to enlarge the free space.

4. The disc device according to claim 3, wherein the control means evaluates usefulness of the damaged portion information in recording medium units, and deletes the damaged portion information in recording medium units.

5. The disc device according to claim 1, wherein the control means collects the dispersed free spaces so as to be continuous when the capacity of the free space in the storage area becomes greater than or equal to the necessary capacity by deletion of information from the storage area, and saves the new complementary information in the free space.

6. The disc device according to claim 1, further comprising:

a setting means for selecting information saved in the storage area and setting to forcibly hold the information.

7. A disc device for reading and reproducing video and sound information recorded on an optical disc, the device comprising:

an acquiring means for acquiring complementary information through network communication from a server storing the complementary information for complementing information recorded in a damaged portion from which the information on the optical disc cannot be normally read;

a control means for reproducing the information recorded on the optical disc while complementing the information recorded in the damaged portion of the optical disc with the complementary information;

a storage means formed with a storage area for saving the complementary information acquired by the acquiring means and management information for managing the damaged portion and the complementary information and complementing the information in the damaged portion; and a setting means for selecting the information saved in the storage area and setting to forcibly hold the information, wherein when information cannot be normally read from the optical disc, the control means acquires the complementary information of the corresponding damaged portion from the server by the acquiring means, and when a capacity of a free space not saving the information in the storage area is less than a capacity necessary for saving the acquired new complementary information, the control means evaluates usefulness of the complementary information and usefulness of damaged portion information contained in the management information corresponding to the complementary information respectively based on time elapsed from last referenced time, a reference count, and an acquisition required expense for the complementary information saved in the storage area, and firstly deletes the complementary information from the storage area in order of lower usefulness to enlarge the free space, then deletes the damaged portion information from the storage area in order of lower usefulness to enlarge the free space, and collects the dispersed free spaces so as to be continuous to save the new complementary information in the free space when the capacity of the free space becomes greater than or equal to the necessary capacity.

* * * * *